United States Patent
Ahn et al.

(10) Patent No.: US 10,433,312 B2
(45) Date of Patent: Oct. 1, 2019

(54) METHOD OF PERFORMING UPLINK TRANSMISSION IN WIRELESS COMMUNICATION SYSTEM AND APPARATUS THEREFOR

(71) Applicant: LG ELECTRONICS INC., Seoul (KR)

(72) Inventors: Minki Ahn, Seoul (KR); Jiwon Kang, Seoul (KR); Kijun Kim, Seoul (KR); Jonghyun Park, Seoul (KR); Changhwan Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/887,326

(22) Filed: Feb. 2, 2018

(65) Prior Publication Data
US 2018/0234959 A1    Aug. 16, 2018

Related U.S. Application Data

(60) Provisional application No. 62/454,804, filed on Feb. 5, 2017, provisional application No. 62/505,102, filed on May 11, 2017.

(51) Int. Cl.
*H04W 72/04* (2009.01)
*H04L 1/16* (2006.01)

(52) U.S. Cl.
CPC ....... *H04W 72/046* (2013.01); *H04W 72/042* (2013.01); *H04W 72/0406* (2013.01); *H04L 1/16* (2013.01)

(58) Field of Classification Search
CPC .......... H04W 72/046; H04W 72/0406; H04W 72/042; H04L 1/16
USPC .................................................. 370/329, 252
See application file for complete search history.

(56) References Cited

U.S. PATENT DOCUMENTS

| | | | | |
|---|---|---|---|---|
| 2013/0065622 A1* | 3/2013 | Hwang | ................. | H04W 16/28 455/500 |
| 2013/0258885 A1* | 10/2013 | Yu | ......................... | H04W 16/28 370/252 |
| 2014/0004898 A1* | 1/2014 | Yu | ..................... | H04W 72/0413 455/510 |
| 2017/0302341 A1* | 10/2017 | Yu | ........................ | H04B 7/0639 |
| 2017/0302355 A1* | 10/2017 | Islam | ................... | H04B 7/0639 |
| 2018/0124733 A1* | 5/2018 | Vilaipornsawai | ..... | H04W 76/27 |

* cited by examiner

*Primary Examiner* — Kwang B Yao
*Assistant Examiner* — Syed M Bokhari
(74) *Attorney, Agent, or Firm* — Dentons US LLP

(57) ABSTRACT

In the present invention, a method for performing an uplink transmission in a wireless communication system and an apparatus for supporting the same are disclosed. Particularly, a method for transmitting an uplink control channel in a wireless communication system by a terminal may comprise receiving, from a base station, beam information regarding one or more beams for transmitting a physical uplink control channel (PUCCH), via a radio resource control (RRC) signaling; receiving, from the base station, beam indication information indicating a specific beam among the one or more beams using a medium access control-control element (MAC-CE); and transmitting, to the base station, the physical uplink control channel using the specific beam.

10 Claims, 8 Drawing Sheets

METHOD OF PERFORMING UPLINK TRANSMISSION IN WIRELESS COMMUNICATION SYSTEM AND APPARATUS THEREFOR

CROSS-REFERENCE TO RELATED APPLICATIONS

This application claims the benefit of U.S. Provisional Application No. 62/454,804, filed on Feb. 5, 2017 and U.S. Provisional Application No. 62/505,102, filed on May 11, 2017.

The contents of this application are hereby incorporated by reference in its entirety.

BACKGROUND OF THE INVENTION

Field of the Invention

The present invention relates to a wireless communication system and, more specifically, to a method for indicating an uplink transmission beam for uplink transmission of a terminal, and an apparatus for supporting the same.

Related Art

Mobile communication systems have been developed in order to provide voice service while securing user mobility. However, since the service range of mobile communication system extended has been extended to data service as well as voice service, current explosive traffic increase causes lack or resources, and users require faster services, enhanced mobile communication systems are needed.

Next-generation mobile communication systems are required to accept explosively increasing data traffic, increase throughput per user, accept a remarkably increased number of connection devices and support very low end-to-end latency and high energy efficiency. To this end, various techniques such as dual connectivity, massive MIMO (massive Multiple Input Multiple Output), in-band full duplex, NOMA (Non-Orthogonal Multiple Access), super wideband support, and device networking are studies.

SUMMARY OF THE INVENTION

The present description proposes a method of transmitting an uplink channel and/or a signal by a terminal through an uplink transmission beam in a wireless communication system.

Specifically, the present description proposes a method of indicating an uplink transmission beam of a terminal for uplink transmission.

To this end, the present description proposes a method of indicating an uplink transmission beam of a terminal through downlink control information and/or higher layer signaling.

In addition, the present description proposes a method of indicating an uplink transmission beam of a terminal according to uplink reference signal configuration.

Furthermore, the present description proposes a method of implicitly indicating an uplink transmission beam of a terminal when there is no uplink transmission beam indication by a BS.

It is to be understood that technical objects to be achieved by the present invention are not limited to the aforementioned technical objects and other technical objects which are not mentioned herein will be apparent from the following description to one of ordinary skill in the art to which the present invention pertains.

According to an embodiment of the present disclosure, a method for transmitting an uplink control channel in a wireless communication system by a terminal, the method comprise receiving, from a base station, beam information regarding one or more beams for transmitting a physical uplink control channel (PUCCH), via a radio resource control (RRC) signaling; receiving, from the base station, beam indication information indicating a specific beam among the one or more beams using a medium access control-control element (MAC-CE); and transmitting, to the base station, the physical uplink control channel using the specific beam.

In addition, in the embodiment, the beam information and the beam indication information are configured in the form of a resource index of a reference signal.

In addition, in the embodiment, the reference signal is a sounding reference signal (SRS).

In addition, in the embodiment, the reference signal is a specific downlink reference signal and the specific beam is a transmission beam corresponding to a reception beam for receiving the specific downlink reference signal.

According to another embodiment of the present disclosure, an apparatus for transmitting an uplink control channel in a wireless communication system, the apparatus comprise a transmission/reception unit for transmitting and receiving a radio signal and a processor functionally coupled to the transmission/reception unit. The processor is configured to receive, from a base station, beam information regarding one or more beams for transmitting a physical uplink control channel (PUCCH), via a radio resource control (RRC) signaling; receive, from the base station, beam indication information indicating a specific beam among the one or more beams using a medium access control-control element (MAC-CE); and transmit, to the base station, the physical uplink control channel using the specific beam.

In addition, in the another embodiment, the beam information and the beam indication information are configured in the form of a resource index of a reference signal.

In addition, in the another embodiment, the reference signal is a sounding reference signal (SRS).

In addition, in the another embodiment, the reference signal is a specific downlink reference signal and the specific beam is a transmission beam corresponding to a reception beam for receiving the specific downlink reference signal.

According to other embodiment of the present disclosure, a method for performing an uplink transmission in a wireless communication system by a terminal without beam correspondence, the method comprises transmitting, to a base station, at least one Uplink Reference Signal (UL RS), receiving, from the base station, indication information for an Uplink Transmission beam (UL Tx beam) of the terminal, and transmitting, to the base station, a specific uplink channel through the UL Tx beam based on the indication information. In here, the UL Tx beam is determined among one or more UL Tx beams of the terminal by using the at least one UL RS, and if the terminal does not receive the indication information from the base station, the specific uplink channel is transmitted through a pre-determined UL Tx beam of the terminal.

In addition, in the other embodiment, the at least one UL RS is configured to correspond to the one or more uplink transmission beams.

In addition, in the other embodiment, the pre-determined UL Tx beam is configured based on a specific downlink reception beam (DL Rx beam) among one or more DL Rx beams of the terminal, and the specific DL Rx beam supports the best reception quality for at least one of downlink channel or downlink reference signal received from the base station.

In addition, in the other embodiment, if the at least one UL RS is transmitted over a plurality of slots, the method further comprises receiving, from the base station, indication information for prohibiting transmission through the UL Tx beam before a beam procedure related to the at least one UL RS is terminated.

In addition, in the other embodiment, the pre-determined UL Tx beam is configured based on a specific downlink reception beam (DL Rx beam) among one or more DL Rx beams of the terminal, and the specific DL Rx beam corresponds to a downlink transmission beam (DL Tx beam) indicated by the base station.

In addition, in the other embodiment, the DL Tx beam is a DL Tx beam of the base station most recently indicated by the base station.

In addition, in the other embodiment, the pre-determined UL Tx beam is a UL Tx beam indicated by the base station in an initial access procedure between the terminal and the base station.

In addition, in the other embodiment, the indication information is received through at least one of downlink control information or higher layer signaling.

In addition, in the other embodiment, if the indication information is received through the downlink control information, the indication information comprises indicator for whether to update the UL Tx beam of the terminal.

In addition, in the other embodiment, if the indication information is received through the higher layer signaling, the method further comprises transmitting, to the base station, ACK/NACK information for the indication information.

According to embodiments of the present invention, a terminal without beam correspondence may also transmit an uplink channel and/or a signal according to explicit or implicit uplink transmission beam indication.

In addition, according to embodiments of the present invention, uplink beam indication of a terminal is performed hierarchically and thus may be efficient in terms of a time taken for beam change and control overhead.

Furthermore, according to embodiments of the present invention, with respect to ambiguousness of beam change which may occur in a beam management procedure (e.g., beam sweeping), a base station indicates an explicit beam change time to a terminal to prevent the ambiguousness.

It will be appreciated by persons skilled in the art that the effects that may be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF EXEMPLARY EMBODIMENTS

Figure 1:
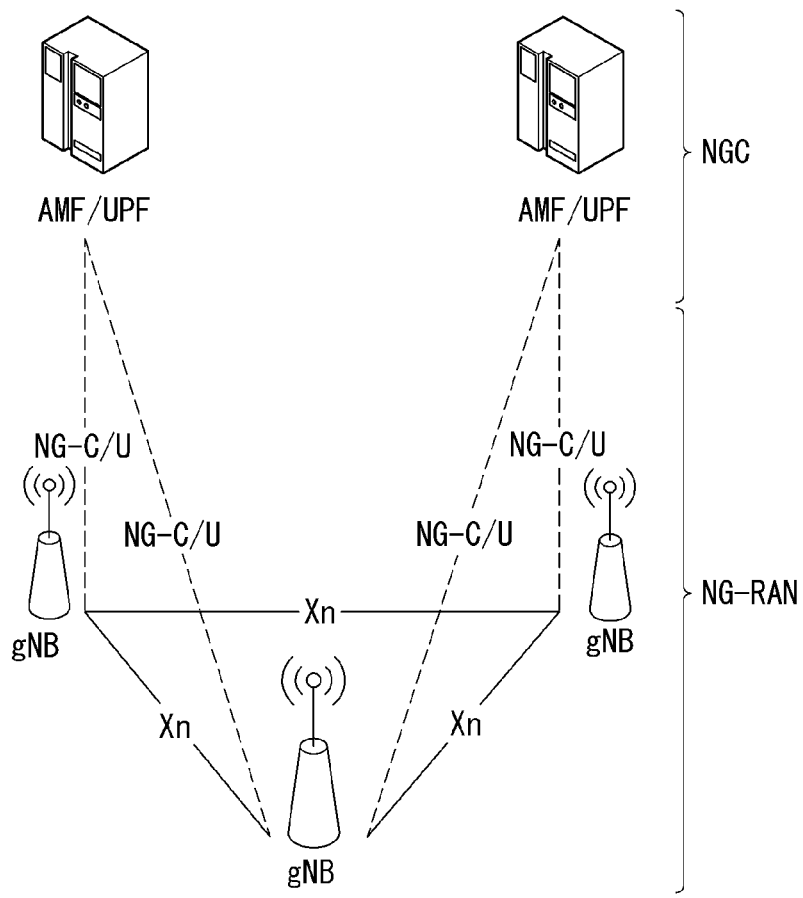
FIG. 1 is a diagram illustrating an example of overall system architecture of NR (New RAT) to which methods proposed in the present description are applicable.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that may be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams.

In the present description, a base station (BS) refers to a terminal mode of a network, which directly communicates with a terminal. A specific operation described as performed by the BS may be performed by an upper node of the BS. Namely, it is apparent that, in a network comprised of a plurality of network nodes including an eNB, various operations performed for communication with a UE may be performed by the eNB, or network nodes other than the eNB. The term "base station (BS)" may be replaced with the term "fixed station", "Node B", "evolved Node B (eNode B or eNB)", "base transceiver system (BTS)", "Access Point (AP)" general NB (gNB)", etc. A "terminal" may be fixed or may have mobility and the term "terminal" may be replaced with the term "User Equipment (UE)", "Mobile Station (MS)", "User Terminal (UT)", "Mobile Subscriber Station (MSS)", "Subscriber Station (SS)", "Advanced Mobile Station (AMS)", "Wireless Terminal (WT)", "Machine-Type Communication (MTC) device", "Machine-to-Machine (M2M) device, "Device-to-Device (D2D) device", etc.

In the following, downlink (DL) refers to communication from a BS to a UE and uplink (UL) refers to communication from a UE to a BS. On downlink, a transmitter may be a part of a BS and a receiver may be a part of a UE. On uplink, a transmitter may be a part of a UE and a receiver may be a part of a BS.

Specific terms used in the following description are provided to aid in understating the present invention and the terms may be changed without departing from the spirit and essential characteristics of the present invention.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Non-Orthogonal Multiple Access (NOMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

The embodiments of the present invention may be supported by standard documents disclosed for at least one of wireless access systems, IEEE 802, 3GPP and 3GPP2. Steps or parts that are not described to clarify the technical features of the present invention may be supported by those documents. Further, all terms as set forth herein may be explained by the standard documents.

For clarity, this application focuses on the 3GPP LTE/LTE-A system. However, the technical features of the present invention are not limited thereto.

Definition of Terminology eLTE eNB: eLTE eNB is evolution of an eNB supporting connection to an EPC and an NGC.

gNB: a node supporting NR as well as connection with an NGC.

New RAN: a wireless access network supporting NR or E-UTRA or interoperating with an NGC.

Network slice: a network defined by an operator to provide a solution optimized for a specific market scenario that requires specific requirements with end-to-end range.

Network function: a logical node in a network infrastructure having a well-defined external interface and a well-defined functional operation.

NG-C: a control plane interface used for an NG2 reference point between a new RAN and an NGC.

NG-U: a user plane interface used for an NG3 reference point between a new RAN and an NGC.

Non-standalone NR: a layout in which a gNB requests an LTE eNB as an anchor for connecting a control plane to an EPB or request an eLTE eNB as an anchor for connecting a control plane to an NGC.

Non-standalone E-UTRA: an array in which an eLTE eNB requests a gNB as an anchor for connecting a control plane to an NGC.

User plane gateway: An endpoint of an NG-U interface.

System Overview

FIG. 1 is a diagram illustrating an example of overall system architecture of NR (New RAT) to which methods proposed in the present description are applicable;

Referring to FIG. 1, an NG-RAN is composed of gNBs which provide an NG-RA user plane (new AS sublayer/PDCP/RLC/MAC/PHY) and a control plane (RRC) protocol end for user equipment (UE).

The gNBs are connected to each other through an Xn interface.

In addition, the gNBs are connected to an NGC through an NG interface.

More specifically, the gNBs are connected to an AMF (Access and Mobility Management Function) through an N2 interface and connected to a UPF (User Plane Function) through an N3 interface.

NR (New Rat) Numerology and Frame Structure

In an NR system, a plurality of numerologies may be supported. Here, numerology may be defined by subcarrier spacing and Cyclic Prefix (CP) overhead. In this case, a spacing of a plurality of subcarriers may be derived by scaling a basic subcarrier spacing using an integer N (or µ). In addition, even if a very small subcarrier spacing is not used at a very high carrier frequency, used numerology may be selected independently of a frequency band.

Further, various frame structures according to a plurality of numerologies may be supported in the NR system.

Hereinafter, Orthogonal Frequency Division Multiplexing (OFDM) numerology and frame structures which may be considered in the NR system will be described.

A plurality of OFDM numerologies supported in the NR system may be defined as shown in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

With respect to a frame structure in the NR system, sizes of various fields in the time domain are represented as multiples of the time unit of $T_s=1/(\Delta f_{max} \cdot N_f)$. Here, $\Delta f_{max}=480 \cdot 10^3$ and $N_f=4096$. Downlink and uplink transmission is performed in a radio frame having a period of $T_f=(\Delta f_{max} N_f/100) \cdot T_s=10$ ms. Here, the radio frame is composed of 10 subframes each of which has a period of $T_{sf}=(\Delta f_{max} \cdot N_f/1000) \cdot T_s=1$ ms. In this case, one set of frames for uplink and one set of frames for downlink may be present.

Figure 2:
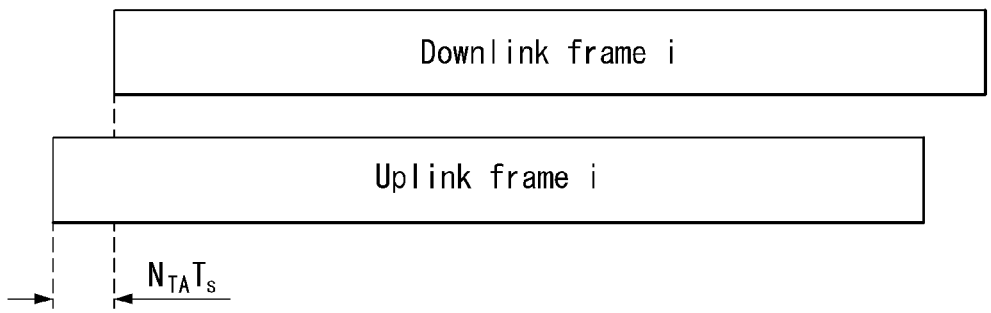
FIG. 2 illustrates a relationship between an uplink frame and a downlink frame in a wireless communication system to which the methods proposed in the present description are applicable.

FIG. 2 illustrates a relationship between an uplink frame and a downlink frame in a wireless communication system to which methods proposed in the present description are applicable.

As shown in FIG. 2, transmission of uplink frame #i from a UE needs to be started $T_{TA}=N_{TA}T_s$ before a downlink frame corresponding thereto in the UE.

For numerology µ, slots are numbered in a subframe in ascending order of $n_s^\mu \in \{0, \ldots, N_{subframe}^{slots, \mu}-1\}$ and numbered in a radio frame in ascending order of $n_{s,f}^\mu \in \{0, \ldots, N_{frame}^{slots,\mu}-1\}$. One slot is composed of $N_{symb}^\mu$ consecutive OFDM symbols, wherein $N_{symb}^\mu$ is determined according to used numerology and slot configuration. Start of a slot $n_s^\mu$ in a subframe is temporally aligned with start of an OFDM symbol $n_s^\mu N_{symb}^\mu$ in the same subframe.

All UEs may not simultaneously perform transmission and reception, which means that all OFDM symbols of downlink slots and uplink slots may not be used.

Table 2 shows the number of OFDM symbols per slot for a normal CP in numerology μ and Table 3 shows the number of OFDM symbols per slot for an extended CP in numerology μ.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

With respect to physical resources in an NR system, antenna ports, a resource grid, resource elements, resource blocks, carrier part, etc. may be considered.

Hereinafter, the aforementioned physical resources that may be considered in the NR system will be described in detail.

With respect to antenna ports, an antenna port is defined such that a channel carrying symbols on the antenna port may be inferred from a channel carrying other symbols on the same antenna port. When large-scale property of a channel carrying symbols on one antenna port may be inferred from a channel carrying symbols on another antenna port, the two antenna ports may be regarded to be in a quasi-co-located or quasi-co-location (QC/QCL) relationship. Here, the large-scale property includes one or more of delay spread, Doppler spread, frequency shift, average received power, and received timing.

Figure 3:
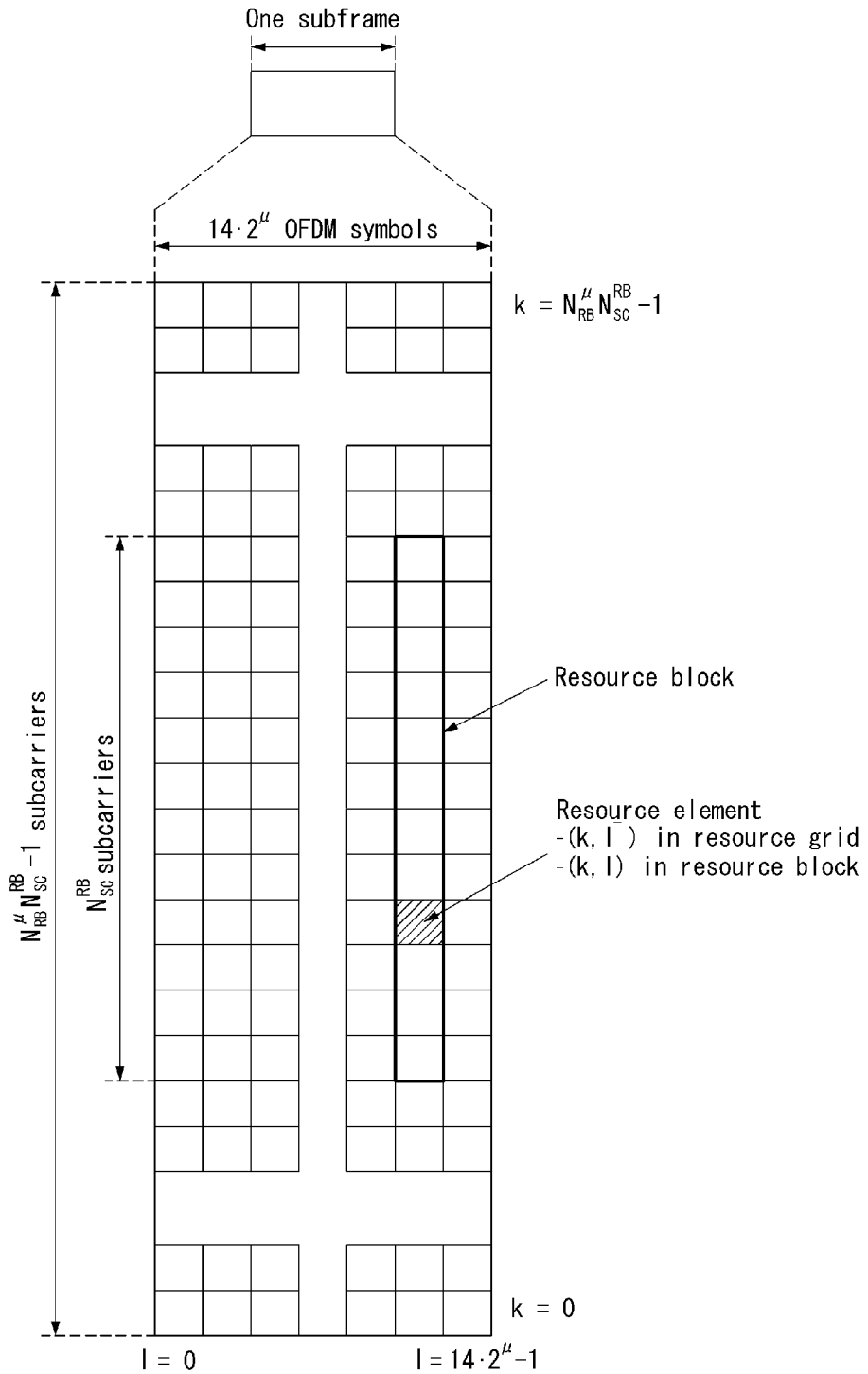
FIG. 3 illustrates an example of a resource grid supported in a wireless communication system to which the methods proposed in the present description are applicable.

FIG. 3 illustrates an example of a resource grid supported in a wireless communication system to which methods proposed in the present description are applicable.

Although FIG. 3 illustrates that the resource grid is composed of $N_{RB}^{\mu} N_{sc}^{RB}$ subcarriers in the frequency domain and one subframe is composed of $14 \cdot 2^{\mu}$ OFDM symbols, the present invention is not limited thereto.

In the NR system, a transmitted signal is described by one or more resource grids composed of $N_{RB}^{\mu} N_{sc}^{RB}$ subcarriers and $2^{\mu} N_{symb}^{(\mu)}$ OFDM symbols. Here, $N_{RB}^{\mu} \leq N_{RB}^{max,\mu}$. $N_{RB}^{max,\mu}$ represents a maximum transmission bandwidth which may change according to uplink and downlink as well as numerologies.

Figure 4:
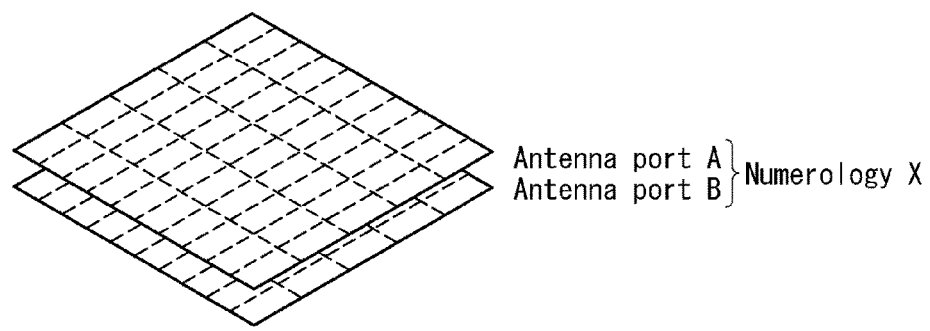
FIG. 4 illustrates examples of a resource grid for each antenna port and each numerology to which the methods proposed in the present description are applicable.
Figure 4:
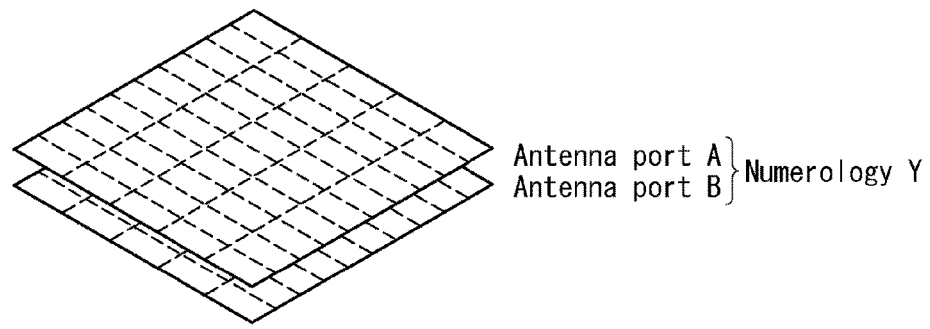

In this case, one resource grid may be configured per numerology μ and antenna port p, as shown in FIG. 4.

FIG. 4 illustrates examples of a resource grid per antenna port and numerology to which methods proposed in the present description are applicable.

Each element of a resource grid per numerology μ and antenna port p is referred to as a resource element and uniquely identified by an index pair (k,l̄). Here, k=0, . . . , $N_{RB}^{\mu} N_{sc}^{RB}-1$ represents an index in the frequency domain l̄=0, . . . , $2^{\mu} N_{symb}^{(\mu)}-1$ represents a symbol position in a subframe. When a resource element is indicated in a slot, an index pair (k,l) is used. Here, l=0, . . . , $N_{symb}^{\mu}-1$.

A resource element (k, l̄) for numerology μ and antenna port p corresponds to a complex value $a_{k,\bar{l}}^{(p,\mu)}$. When there is no risk of confusion or a specific antenna port or numerology is not designated, indices p and μ may be dropped, and thus the complex value) may become $a_{k,\bar{l}}^{(p)}$ or $a_{k,\bar{l}}$.

In addition, a physical resource block is defined as $N_{sc}^{RB}=12$ consecutive subcarriers in the frequency domain. In the frequency domain, physical resource blocks are numbered from 0 to $N_{RB}^{\mu}-1$. Here, a relationship between a physical resource block number $n_{PRB}$ and resource elements (k,l) in the frequency domain is given by Equation 1.

$$n_{PRB} = \left\lfloor \frac{k}{N_{sc}^{RB}} \right\rfloor \qquad \text{[Equation 1]}$$

With respect to carrier part, a UE may be configured to perform reception or transmission using only subsets of a resource grid. Here, sets of resource blocks configured to be received or transmitted by the UE are numbered from 0 to $N_{URB}^{\mu}-1$.

Beam Management

Beam management in NR is defined as follows.

Beam management: a set of L1/L2 procedures for acquiring and maintaining TRPs and/or UE beams that may be used for DL and UL transmission and reception, which includes the following:

Beam determination: operation of a TRP or a UE to select a transmission/reception beam thereof.

Beam measurement: operation of a TRP or a UE to measure properties of a received beamforming signal.

Beam reporting: UE operation of reporting information of a beamformed signal on the basis of beam measurement.

Beam sweeping: operation of covering a spatial area using transmitted and/or received beams at predetermined time intervals.

In addition, Tx/Rx beam correspondence in a TRP and a UE is defined as follows.

Tx/Rx beam correspondence in a TRP is maintained when at least one of the following conditions is satisfied.

TRP may determine a TRP Rx beam for uplink reception on the basis of downlink measurement of a UE for one or more transmission beams.

TRP may determine TRP Tx beam for downlink transmission on the basis of uplink measurement of TRP for one or more Rx beams.

Tx/Rx beam correspondence in a UE is maintained when at least one of the following conditions is satisifed.

UE may determine a UE Tx beam for uplink transmission on the basis of downlink measurement of UE for one or more Rx beams.

UE may determine a UE Rx beam for downlink reception on the basis of indication of TRP based on uplink measurement for one or more Tx beams.

TRP is supported to indicate capability of UE beam correspondence related information.

The following DL L1/L2 beam management procedures are supported in one or more TRPs.

P-1: used to enable UE measurement for different TRP Tx beams in order to support selection of TRP Tx beam/UE Rx beams.

Beamforming in a TRP includes intra/inter-TRP Tx beam sweeping in different beam sets. Beamforming in a UE includes UR Rx beaming sweeping from different beam sets.

P-2: used for UE measurement for different TRP Tx beams to change inter/intra-TRP Tx beams.

P-3: used for UE measurement for the same TRP Tx beam to change UE Rx beams when the UE uses beamforming.

Aperiodic reporting triggered by at least a network is supported in P-1, P-2 and P-3 related operations.

UE measurement based on an RS for beam management (at least CSI-RS) uses K (a total number of beams) beams, and a UE reports a result of measurement of selected N Tx beams. Here, N is not a fixed number. A procedure based on an RS for mobility is not excluded. Reported information includes information indicating measurement quantity with respect to N beams and N DL Tx beams when N<K. Particularly, the UE may report N' CRIs (CSI-RS resource indicators) with respect to K'>1 non-zero power (NZP) CSI-RS resources.

The UE may be configured with the following higher layer parameters for beam management.

N≥1 reporting setting, M≥1 resource setting

Links between reporting setting and resource setting are set in agreed CSI measurement setting.

CSI-RS based P-1 and P-2 are supported by resource and reporting setting.

P-3 may be supported irrespective of presence or absence of reporting setting.

Reporting setting including at least the following

Information indicating a selected beam

L1 measurement reporting

Time domain operation (e.g., aperiodic operation, periodic operation and semi-persistent operation)

Frequency granularity when multiple frequency granularities are supported

Resource setting including at least the following

Time domain operation (e.g., aperiodic operation, periodic operation and semi-persistent operation)

RS type: at least NZP CSI-RS

At least one CSI-RS resource set. Each CSI-RS resource set includes K≥1 CSI-RS resources (some parameters of K CSI-RS resources, for example, port number, time domain operation, density and period, may be identical).

Furthermore, NR supports the following beam reporting in consideration of L groups (L>1).

Information indicating a minimum group

Measurement quantity with respect to N1 beams (L1 RSRP and CSI reporting support (when a CSI-RS is for CSI acqusition))

Information indicating $N_1$ DL Tx beams when available

The aforementioned group based beam reporting may be set per UE. In addition, the group based beam reporting may be turned off per UE (when L=1 or $N_1$=1, for example).

NR supports a UE in triggering a mechanism of recovering from beam failure.

A beam failure event occurs when the quality of beam pair link of associated control channels is sufficiently low (e.g., comparison with a threshold value or time-out of an associated timer). The mechanism of recovering from beam failure is triggered when beam failure occurs.

A network is explicitly configured for a UE having resources for transmitting a UL signal for the purpose of recovery. Configuration of resources is supported in a region where a BS listens in all or some directions (e.g., random access region).

UL transmission/resources for reporting beam failure may be positioned at the same time instance as a PRACH (resources perpendicular to PRACH resources) or a different time instance (which may be configured for the UE) from the PRACH. DL signal transmission is supported such that the UE may monitor beams in order to identify new latent beams.

NR supports beam management irrespective of beam-related indication. When beam-related indication is provided, information about a beam formation/reception procedure of the UE used for CSI-RS based measurement may be indicated to the UE through QCL. As QCL parameters supported in NR, a spatial parameter for beamforming at a receiver is expected to be added in addition to delay, Doppler, average gain, etc. used in LTE, and angle-of-arrival related parameters from the viewpoint of UE reception beamforming and/or angle-of-departure related parameters from the viewpoint of BS reception beamforming may be included. NR supports use of identical or different beams in control channel and data channel transmission.

For NR-PDCCH transmission supporting robustness for beam pair link blocking, the UE may be configured to simultaneously monitor NR-PDCCH on M beam pair links. Here, M≥1 and a maximum value of M may depend on at least UE capability.

The UE may be configured to monitor NR-PDCCH on different beam pair links in different NR-PDCCH OFDM symbols. A parameter related to UE Rx beam setting for monitoring NR-PDCCH on multiple beam pair links is configured through higher layer signaling or MAC CE and/or considered in search space design.

NR at least supports indication of spatial QCL assumption between DL RS antenna ports and DL RS antenna ports for DL control channel demodulation. Maydidate signaling methods for beam indication for NR-PDCCH (i.e., a configuration method of monitoring NR-PDCCH) are MAC CE signaling, RRC signaling, DCI signaling, specification transparent and/or implicit method, and a combination of these signaling methods.

For unicast DL data channel reception, NR supports indication of spatial QCL assumption between DL RS antenna ports and DMRS antenna ports of a DL data channel.

Information representing an RS antenna port is indicated through DCI (downlink permission). This information indicates an RS antenna port quasi-co-located with a DMRS antenna port. Different sets of DMRS antenna ports for DL data channels may be represented as QCL with other sets of RS antenna ports.

Hybrid Beamforming

Conventional beamforming techniques using multiple antennas may be divided into an analog beam forming technique and a digital beamforming technique according to position to which beamforming weight vector/precoding vector are applied.

The analog beamforming technique is a beamforming technique applied to a multiple antenna structure in the initial stage. This technique may refer to a technique of branching off an analog signal that has been subjected to digital signal processing to multiple paths and then applying phase shift (PS) and power amplifier (PA) setting to each path to form a beam.

For analog beamforming, a structure in which PA and PS connected to each antenna process an analog signal derived from a single digital signal is required. In other words, the PA and PS process a complex weight in an analog stage.

Figure 5:
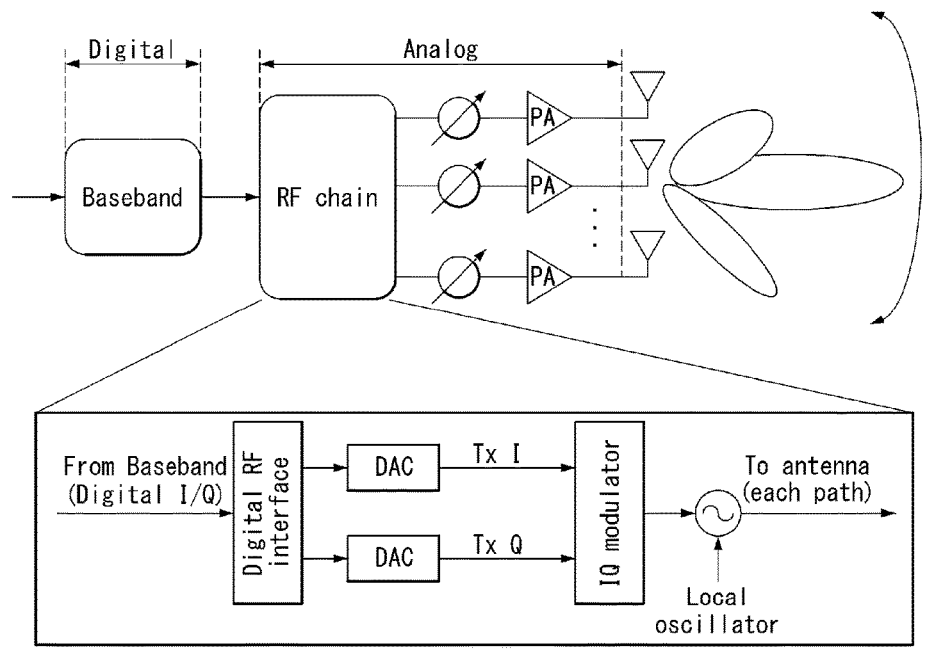
FIG. 5 is an exemplary block diagram of a transmitter composed of an analog beamformer and an RF chain.

FIG. 5 is an exemplary block diagram of a transmitter composed of an analog beamformer and an RF chain. FIG. 5 is for convenience of description and does not limit the scope of the present invention.

In FIG. 5, the RF chain refers to a processing block for converting a baseband (BB) signal into an analog signal. The analog beamforming technique determines beam accuracy according to properties of the PA and PS elements and may be advantageous for narrow band transmission owing to control characteristics of the elements.

In addition, the analog beamforming technique is configured in a hardware structure in which it is difficult to implement multi-stream transmission and thus has relatively low multiplexing gain for transmission rate enhancement. In this case, beamforming per UE based on orthogonal resource allocation may not be easy.

On the contrary, in the case of the digital beamforming technique, beamforming is performed in a digital stage using a baseband (BB) process in order to maximize diversity and multiplexing gain in a MIMO environment.

Figure 6:
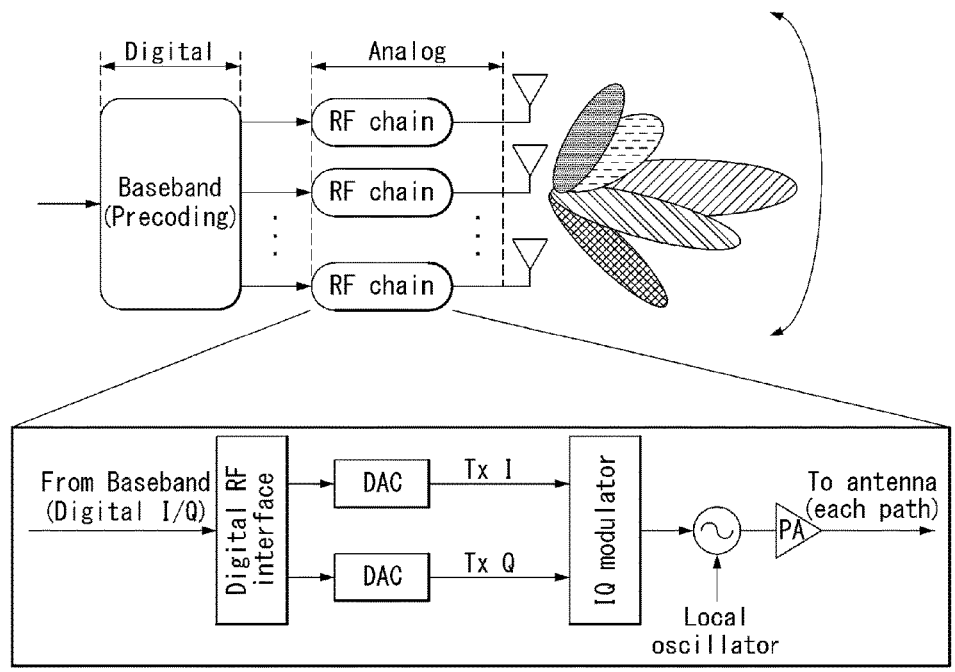
FIG. 6 is an exemplary block diagram of a transmitter composed of a digital beamformer and an RF chain.

FIG. 6 is an exemplary block diagram of a transmitter composed of a digital beamformer and an RF chain. FIG. 5 is for convenience of description and does not limit the scope of the present invention.

In FIG. 6, beamforming may be performed when precoding is performed in a BB process. Here, the RF chain includes a PA because a complex weight derived for beamforming is directly applied to transmitted data in the case of digital beamforming.

In addition, formation of beams for multiple users may be simultaneously supported because beamforming is performed per UE. Furthermore, since independent beamforming may be performed per UE assigned orthogonal resources, scheduling flexibility is improved and thus transmitter operation meeting the purpose of the system may be performed. Moreover, an independent beam may be formed per subcarrier when a technology such as MIMO-OFDM is applied to an environment supporting wideband transmission.

Accordingly, the digital beamforming technique may maximize a maximum transmission rate of a single UE (or user) on the basis of capacity improvement of the system and enhanced beam gain. On the basis of the above-described properties, digital beamforming based MIMO has been introduced to legacy 3G/4G (e.g., LTE(-A)) systems.

In the NR system, a massive MIMO environment in which the number of Tx/Rx antennas remarkably increase may be considered. In general, a maximum number of Tx/Rx antennas applied to a MIMO environment is assumed to be 8 in cellular communication. However, the number of Tx/Rx antennas may increase to tens or hundreds since the massive MIMO environment is considered.

When the aforementioned digital beamforming technique is applied in the massive MIMO environment, a transmitter needs to perform signal processing for hundreds of antennas through a BB process for digital signal processing. This may remarkably increase signal processing complexity and also increase hardware implementation complexity because as many RF chains as the number of antennas are required.

In addition, the transmitter needs to perform independent channel estimation for all antennas. Furthermore, the transmitter requires feedback information about massive MIMO channels configured according to all antennas in the case of an FDD system, and thus pilot and/or feedback overhead may considerably increase.

When the aforementioned analog beamforming technique is applied in the massive MIMO environment, hardware complexity of the transmitter is relatively low.

On the other hand, performance enhancement using multiple antennas is very low and flexibility of resource allocation may decrease. Particularly, it is difficult to control beams per frequency in wideband transmission.

Accordingly, it is necessary to configure a transmitter in a hybrid form by combining the analog beamforming and digital beamforming instead of exclusively selecting only one of analog beamforming and digital beamforming in the massive MIMO environment.

In this case, a hybrid transmitter may be configured using a relationship of performance gain and complexity between analog beamforming and digital beamforming.

Analog Beamforming

In general, analog beamforming may be used in an analog beamforming transmitter/receiver and a hybrid beamforming transmitter/receiver. Here, analog beam smayning may perform estimation of one beam at a time. Accordingly, a beam training time necessary for beam smayning is proportional to the number of maydidate beams.

As described above, analog beamforming requires a beam smayning process in the time domain for beam estimation in the transmitter/receiver. Here, estimation time $T_s$ for all Tx/Rx beams may be represented by Equation 2.

$$T_S = t_s \times (K_T \times K_R) \quad \text{[Equation 2]}$$

In Equation 2, $t_s$ denotes a time necessary to smay one beam, $K_T$ represents the number of Tx beams and $K_R$ represents the number of Rx beams.

Figure 7:
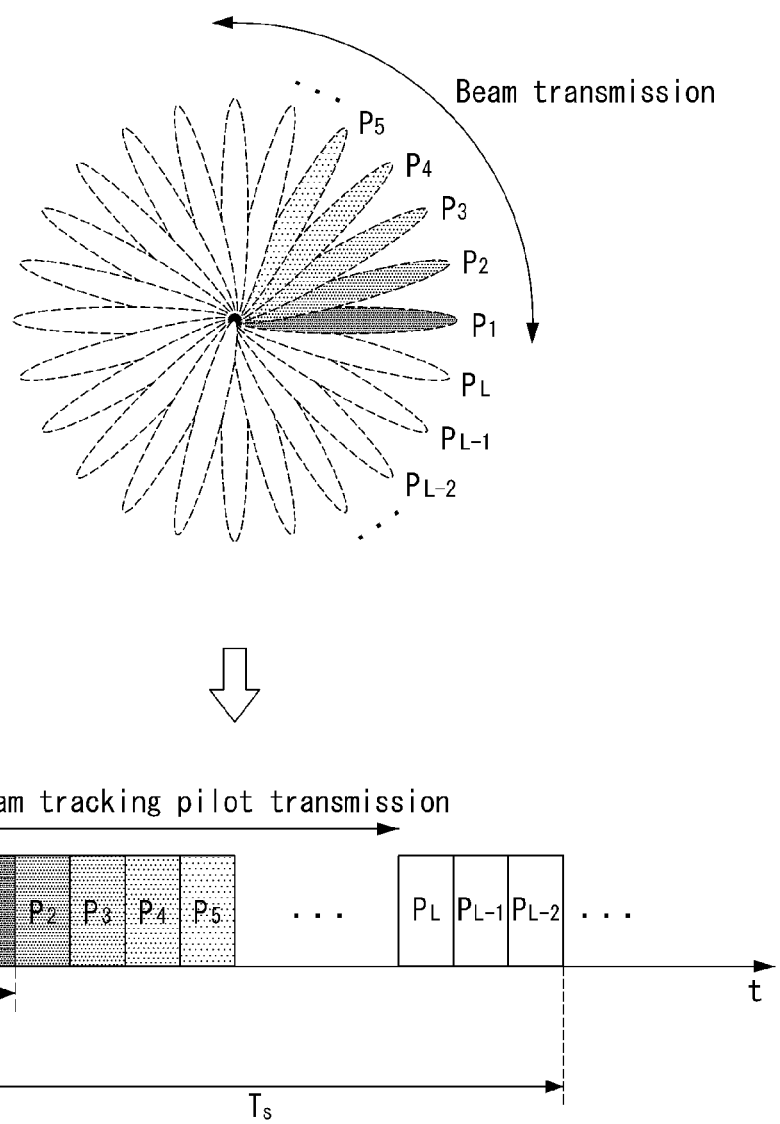
FIG. 7 illustrates an example of analog beam smayning according to various embodiments of the present invention.

FIG. 7 illustrates an example of analog beam smayning according to various embodiments of the present invention. FIG. 7 is shown for convenience of description and does not limit the scope of the present invention.

In FIG. 7, it is assumed that the number of Tx beams, $K_T$, is L and the number Rx beam, $K_R$, is 1. In this case, a total number of maydidate beams is L and thus L time periods are required in the time domain.

In other words, since estimation of only one beam may be performed in a single time period for analog beam estimation, L time periods are required to estimate L beams $P_1$ to $P_L$, as shown in FIG. 7. A UE feeds back the identifier (ID) of a beam having the highest signal strength to a BS after an analog beam estimation procedure is ended. That is, a longer training time may be required when the number of individual beams increases as the number of Tx/Rx antennas increases.

Analog beamforming changes the magnitude and phase angle of continuous waveforms of the time domain after a Digital-to-Analog Converter (DAC), and thus a training period for an individual beam needs to be secured for analog beamforming, distinguished from digital beamforming. System efficiency may decrease (i.e., system loss increases) as the length of the training period increases.

Channel State Information Feedback

In most cellular systems including the legacy LTE system, a UE receives a pilot signal (e.g., a reference signal (RS)) for channel estimation from a BS, calculates channel state information (CSI) and reports the calculated value to the BS. The BS transmits a data signal (i.e., downlink data) on the basis of the CSI fed back from the UE. In the case of the LTE system, the CSI fed back by the UE includes channel quality information (CQI), a precoding matrix index (PMI) and a rank indicator (RI). Hereinafter, CQI feedback, PMI feedback and RI feedback will be described in detail.

CQI feedback is radio channel quality information provided by a UE to a BS for the purpose of providing information about a modulation and coding scheme (MCS) applied by the BS for data transmission. When radio quality between the BS and the UE is high, the UE feeds back a high CQI value to the BS. Then, the BS transmits data using a relatively high modulation order and low channel coding rate. When radio quality between the BS and the UE is low, the UE feeds back a low CQI value to the BS. In this case, the BS transmits data using a relatively low modulation order and high channel coding rate.

PMI feedback is preferred precoding matrix information provided by the UE to the BS for the purpose of providing information about a MIMO precoding scheme to be applied when the BS configures multiple antennas. The UE estimates a downlink MIMO channel between the BS and the UE from a pilot signal and delivers information about efficient MIMO precoding to be applied by the BS through PMI feedback. In the LTE system, only linear MIMO precoding that may be represented in the form of a matrix is considered in PMI configuration.

In this case, the BS and the UE share a codebook composed of a plurality of precoding matrices, and MIMO precoding matrices in the codebook have unique indices. Accordingly, the UE feeds back the index corresponding to the most preferred MIMO precoding matrix through a PMI to minimize the quantity of feedback information of the UE. Here, a PMI value need not be necessarily configured as one index. For example, when the number of Tx antenna ports is 8, 8 Tx MIMO precoding matrices may be derived by combining two indices (i.e., a first PMI and a second PMI).

RI feedback is information about the number of preferred transport layers provided by the UE to the BS when the UE and the BS may perform multi-layer transmission through spatial multiplexing using multiple antennas. Here, the RI and the PMI are closely related to each other because the BS needs to determine which precoding will be applied to each layer on the basis of the number of transport layers.

In PMI/RI feedback configuration, a method of configuring a PMI codebook on the basis of single layer transmission, defining a PMI per layer and feeding back the PMI by a UE may be considered. However, this method remarkably increases the quantity of PMI/RI feedback information as the number of transport layers increases. Accordingly, a PMI codebook is defined per number of transport layers in the LTE system. That is, N number of Nt×R matrices are defined in a codebook for R-layer transmission. Here, R is the number of layers, Nt is the number of Tx antenna ports, and N is the size of the codebook. Accordingly, the size of a PMI codebook is defined irrespective of the number of transport layers in the LTE system. In this case, the number of transport layers, R, corresponds to the rank value of a precoding matrix (Nt×R matrix).

The PMI/RI described in the present description are not limited to the PMI/RI which refer to the index value and the rank value of a precoding matrix (Nt×R matrix) in the LTE system. Furthermore, the PMI described in the present description refers to information representing a preferred MIMO precoder among MIMO precoders applicable to a transmitter. In this case, the form of a precoder is not limited to a linear precoder that may be represented as a matrix. In addition, the RI described in the present description includes any feedback information representing the number of preferred transport layers and may be interpreted in a broader sense than the RI in LTE.

Such CSI may be generated for all of system frequency regions or generated for some frequency regions. Particularly, a method of generating and feeding back CSI for a preferred frequency region (e.g., subband) per UE may be efficient in a wideband (or broadband) system.

In addition, feedback of CSI is performed through an uplink channel in the LTE system. In general, periodic CSI feedback is performed through a PUCCH (Physical Uplink Control Channel) and aperiodic CSI feedback is performed through a PUSCH (Physical Uplink Shared Channel).

PUCCH CSI reporting modes for periodic CSI feedback performed through a PUCCH may be defined as shown in FIG. 4. Here, the PUCCH CSI reporting modes represent information fed back by a UE when the UE performs periodic CSI feedback.

TABLE 4

|  |  | PMI Feedback Type | |
|---|---|---|---|
|  |  | No PMI (OL, single-antenna) | Single PMI (CL) |
| CQI Feedback Type | Wideband | Mode 1-0<br>RI<br>One wideband CQI (4 bit)<br>When RI >1, CQI of first codeword | Mode 1-1<br>RI<br>Wideband CQI (4 bit)<br>Wideband spatial CQI (3 bit) for RI >1<br>Wideband PMI (4 bit) |
|  | UE selected | Mode 2-0<br>RI<br>Wideband CQI (4 bit)<br>Best-1 CQI (4 bit) in each BP<br>Best-1 indicator (L-bit label)<br>When RI >1, CQI of first codeword | Mode 2-1<br>RI<br>Wideband CQI (4 bit)<br>Wideband spatial CQI (3 bit) for RI >1<br>Wideband PMI (4 bit)<br>Best-1 CQI (4 bit) in each BP<br>Best-1 spatial CQI (3 bit) for RI >1<br>Best-1 indicator (L-bit label) |

Differently from periodic CSI feedback, aperiodic CSI feedback is temporarily performed only when a BS requests CSI feedback information. In this case, the BS triggers aperiodic CSI feedback through a downlink control channel such as a PDCCH (Physical Downlink Control Channel)/ePDCCH (enhanced PDCCH). When aperiodic CSI feedback is triggered in the LTE system, PUSCH CSI reporting modes representing information that needs to be fed back by a UE may be defined as shown in Table 5. In this case, a PUSCH CSI reporting mode in which the UE will operate may be indicated through higher layer signaling.

TABLE 5

|  |  | PMI Feedback Type | |
|---|---|---|---|
|  |  | No PMI (OL, TD, single-antenna) | With PMI (CL) |
| PUSCH CQI feedback type | Wideband (Wideband CQI) |  | Mode 1-2: Multiple PMI<br>RI<br>$1^{st}$ wideband CQI (4 bit)<br>$2^{nd}$ wideband CQI (4 bit) if RI >1<br>Subband PMIs on each subband |
|  | UE Selected (subband CQI) | Mode 2-0<br>RI (only for Open-loop SM)<br>Wideband CQI (4 bit) + Best-M CQI (2 bit)<br>Best-M index<br>When RI >1, CQI of first codeword | Mode 2-2: Multiple PMI<br>RI<br>$1^{st}$ wideband CQI (4 bit) + Best-M CQI (2 bit)<br>$2^{nd}$ wideband CQI (4 bit) + Best-M CQI (2 bit) if RI >1<br>Wideband PMI/Best-M PMI<br>Best-M index |
|  | Higher layer-configured (subband CQI) | Mode 3-0<br>RI (only for Open-loop SM)<br>widebandCQI (4 bit) + subbandCQI (2 bit)<br>When RI >1, CQI of first codeword | Mode 3-1: Single PMI<br>RI<br>$1^{st}$ wideband CQI (4 bit) + subband CQI (2 bit)<br>$2^{nd}$ wideband CQI (4 bit) + subband CQI (2 bit) if RI >1<br>Wideband PMI |

In the case of PUCCH, the quantity of data (i.e., a payload size) that may be transmitted at a time is small, and thus it may be difficult to transmit CSI at a time. Accordingly, a CQI and PMI transmission time (e.g., a subframe) and an RI transmission time may be set to be different from each other according to each PUCCH CSI reporting mode. For example, the UE may transmit only the RI at a specific PUCCH transmission time and transmit a wideband CQI at another PUCCH transmission time in Mode 1-0.

In addition, a PUCCH reporting type may be defined according to the type of CSI configured at a specific PUCCH transmission time. For example, a reporting type of transmitting only the RI corresponds to type 3 and a reporting type of transmitting only a wideband CQI corresponds to type 4. A feedback period and an offset value with respect to the RI and a feedback period and an offset value with respect to the CQI/PMI may be indicated (or set) to the UE through higher layer signaling (i.e., higher layer message).

The aforementioned CSI feedback information is included in uplink control information (UCI).

Reference Signal (RS)

Data is transmitted through a radio channel in a wireless communication system and thus signals may be distorted during transmission. To correctly receive a distorted signal at a receiver, distortion of the received signal needs to be corrected using channel information. To detect channel information, a method of transmitting a signal known to both a transmitter and a receiver and a method of detecting channel information using a degree to which a signal is distorted during transmission are used. The aforementioned signal is referred to as a pilot signal or a reference signal.

Most recent mobile communication systems use a method of adopting multiple Tx antennas and multiple Rx antennas to improve transmission/reception data efficiency, instead of a method of using one Tx antenna and one Rx antenna, to transmit packets. When data is transmitted and received using multiple input/output antennas, a channel state between a Tx antenna and an Rx antenna needs to be detected in order to correctly receive signals. Accordingly, each Tx antenna needs to have an individual reference signal.

In the case of the LTE system, the purpose of the pilot signal or RS may be defined as the following four types.

(1) Measurement RS: pilot for channel state measurement
  1) CSI measurement/reporting (short term measurement): link adaptation, rank adaptation, closed loop MIMO precoding, etc.
  2) Long term measurement/reporting: handover, cell selection/reselection, etc.
(2) Demodulation RS: pilot for physical channel reception
(3) Positioning RS: pilot for UE positioning
(4) Multicast-Broadcast Single-Frequency Network Reference Signal (MBSFN RS): pilot for multicast/broadcast services In a mobile communication system, RSs may be divided into an RS for channel information acquisition and an RS for data demodulation. The former needs to be transmitted through a wide band because it is used for a UE to acquire channel information on downlink and to be received and measured by even UEs which do not receive downlink data in a specific subframe. In addition, the former is also used for measurement of handover. The latter is an RS sent by a BS along with corresponding resources when the BS performs downlink transmission, and a UE may perform channel estimation and data demodulation by receiving the RS. This RS needs to be transmitted in a data transmission region.

In this case, to solve an RS overhead problem due to an increase in the number of antennas, a CSI-RS (Channel State Information-RS) may be used as an RS for channel information acquisition and a UE-specific RS may be used as the RS for data demodulation. The CSI-RS is an RS designed for CSI measurement and feedback and has very low RS overhead compared to the CRS (Cell-specific Reference Signal). The CRS supports up to 4 antenna ports, whereas the CSI-RS is designed to support up to 8 antenna ports.

The UE-specific RS is designed for data channel demodulation and is an RS to which a MIMO precoding scheme applied to data transmission to the corresponding UE is equally applied (i.e., precoded RS). Accordingly, as many UE-specific RSs as the number of transport layers (i.e., transmission rank) may be transmitted although as may CRSs and CSI-RSs as the number of antenna ports are transmitted. In addition, the UE-specific RS is transmitted for the purpose of data channel reception of the corresponding UE in the same resource region as the data channel resource region allocated to each UE through a scheduler of a BS and thus is UE-specific.

In the case of LTE uplink, there are a sounding RS (SRS) as a measurement RS, a demodulation RS (DM-RS) with respect to an uplink data channel (PUSCH), and a demodulation RS with respect to an uplink control channel (PUCCH) for ACK/NACK and CSI feedback.

In the case of an NR system, a PTRS (Phase-Tracking Reference Signal) for measuring and tracking phase change may be additionally present.

In the NR system, channel setting and transmission of data and/or control information between a BS and a UE may be performed through a beamforming method. In this case, the BS and the UE determine an optimal (or preferred) beam pair by performing beam tracking and/or beam sweeping. Here, the optimal beam pair refers to a beam pair in which transmission of data and/or control information between the BS and the UE is optimized and consists of a beam of the BS and a beam of the UE.

To determine the optimal beam pair, the BS and the UE measure quality of a link between the BS and the UE using a reference signal (e.g., SRS, CSI-RS, etc.). The BS and the UE determine an optimal beam pair for transmission and reception of data and/or control information on the basis of such measurement and perform transmission and reception of data and/or control information through the determined optimal beam pair.

In an NR system supporting a beamforming method, a UE may not support beam correspondence (or beam reciprocity). That is, a UE without beam correspondence may be considered. Here, the UE without beam correspondence may refer to a UE that may not use a downlink reception beam (DL Rx beam) as an uplink transmission beam because channel reciprocity is not established therefor. In this case, a BS needs to inform the UE of information related to uplink transmission beam (UL Tx beam) for uplink transmission (UL Tx) of the UE.

In the NR system, a UE may acquire information about initial UL Tx beams (referred to as initial UL Tx beam information) through a UL initial access procedure. Here, to acquire the initial UL Tx beam information, the UE may transmit a preamble (i.e., random access channel preamble) while changing Tx beams thereof in the initial access procedure (or initial access step).

This will be described in detail below.

PDCCH transmission of the NR system supports robustness against channel blocking (e.g., channel blockage, UE mobility, etc.) by performing transmission through multiple beam pairs (beam pair link (BPL)).

Specifically, a UE is configured to simultaneously monitor PDCCHs for M BPLs (i.e., NR-PDCCHs). Here, M may be determined according to UE capability. In addition, the UE may be configured to monitor PDCCHs for different BPLs in different PDCCH OFDM symbols. In this case, a PDCCH monitoring period in a specific BPL may be set to be shorter than that in other BPLs. Furthermore, parameters related to UE Rx beam setting for monitoring PDCCHs in multiple BPLs may be configured through higher layer signaling or MAC-CE and/or considered in search space design.

In addition, the NR system supports at least one NW-control mechanism for beam management for uplink transmission. As signals related to the mechanism, a sounding reference signal (SRS), a PRACH preamble and a UL DMRS may be considered. Furthermore, the NR system supports capability indication of information related to UE beam correspondence for a transmission and reception point (TRP).

With respect to uplink, the NR system supports transmission of an SRS precoded into the same UE Tx beam and different UE Tx beams, performed by a UE, in a time duration. Here, different Tx beams in the UE may include Tx beams set differently for SRS resources and/or SRS ports. The same UE Tx beam over ports may include Tx beams for an SRS resource and/or a set of SRS resources. In this case, a BS (e.g., gNB) may receive the SRS and then indicate an SRS port and/or SRS resources selected for the UE.

Accordingly, a method of indicating and/or setting that a UE uses a UL Tx beam in an initial access procedure when a BS does not additionally indicate a UL Tx beam to the UE may be considered. Here, the UL Tx beam in the initial access procedure may refer to a UL Tx beam indicated by UL Tx beam information acquired in the initial access procedure of the UE.

When a UL radio channel environment changes due to movement of UEs and/or movement of surrounding objects (after a UE initial access procedure), procedures for updating or refining UL Tx beams may be required. Particularly, in the case of a UE without beam correspondence, the UE may not update or refine UL Tx beams through downlink reception and thus the aforementioned procedures for UL Tx beams may be essential. Here, it may be inefficient for the UE to perform the UL initial access procedure that requires a long time.

Accordingly, a method of performing UL beam management using a UL reference signal (UL RS) instead of the UL initial access procedure may be considered. Here, UL beam management may refer to a procedure of performing beam sweeping for UL Tx beams and UL Rx beams to discover an optimal beam pair.

Specifically, a BS configures a UL reference signal and/or a UL signal in advance, and UL Tx beams of a UE and/or UL Rx beams of the BS may be determined through UL beam management using the configured UL reference signal and/or the UL signal. For example, the UL reference signal may include a sounding reference signal (SRS) and a demodulation reference signal (DMRS). The UL signal may include a signal in a random access procedure (i.e., random access preamble) and a scheduling request (SR).

A method of indicating information about a determined UE Tx beam (i.e., UL Tx beam) by a BS to a UE and an operating method of the UE therefor will be described below. Specifically, a method of indicating information about a Tx beam of a UE through a downlink control information (DCI) and/or higher layer signaling (e.g., RRC signaling, MAC-CE, etc.) (first embodiment) may be considered. In addition, a method of indicating information about a Tx beam of a UE according to UL RS configuration set by a BS in advance (second embodiment) may be considered.

Here, a case in which the BS determines N Tx beams of the UE as UL Tx beams when the UE supports M Tx beams is assumed. N is equal to or greater than 1 (i.e., N≥1) and N is equal to or smaller than M (i.e., N≤M).

In addition, embodiments which will be described below are discriminated for convenience of description and some components or features of an embodiment may be included in other embodiments or replaced by corresponding components or features of other embodiments. Further, the embodiments which will be described below may be applied together as necessary.

First Embodiment—Method of Indicating Tx Beam of UE Through DCI and/or Higher Layer Signaling As described above, a method of transmitting, by a BS, information about Tx beams (i.e., UL Tx beams) of a UE determined through a UL beam management procedure to the UE through DCI and/or higher layer signaling may be considered. The method may be divided into a method of transmitting the information through DCI (method 1), a method of transmitting the information using higher layer signaling (method 2) and a method of transmitting the information using both DCI and higher layer signaling (method 3) according to used information and/or signaling. Here, method 3 (i.e., the method of transmitting the information using higher layer signaling) may refer to a method of hierarchically indicating information about UL Tx beams of the UE.

In this case, for robustness of an uplink control channel, the BS may indicate different Tx beams for the uplink control channel (e.g., PUCCH) and an uplink data channel (e.g., PUSCH). To indicate different Tx beams for uplink channels, the BS may transmit (deliver) the same beam indication or different beam indications for UL channels to the UE. Alternatively, the BS may transmit only indication for one of uplink channels (e.g., one of the PUCCH and PUSCH) to the UE.

Hereinafter, the aforementioned methods (i.e., method 1, method 2 and method 3) which may be considered for the above-described method will be described in detail.

(Method 1: Method of Indicating Information about a UL Tx Beam Through DCI)

As described above, with respect to Tx beam indication for transmission of an uplink control channel (e.g., PUCCH) and an uplink data channel (e.g., PUSCH), a BS may indicate beams for the two channels equally or differently through DCI. Here, indicating equally may refer to delivery of one beam indication (i.e. same beam indication) for the uplink channels and indicating differently may refer to delivery of different beam indications for the uplink channels.

Here, the DCI (i.e., information indicating UL Tx beams of a UE) may be delivered in the form of a port (i.e., antenna port) and/or a resource index selected according to an allocated (or set) UL RS. For example, when an SRS resource is allocated, the DCI may be configured in the form of an SRS port index and/or an SRS resource index. That is, the BS may transmit the port and/or resource index to the UE to indicate UL Tx beams set for the port and/or resource index to the UE. Alternatively, the DCI may be delivered in the form of a beam ID mapped to a port and/or an index. When the BS indicates information about N beams, the BS may indicate the beams in the ascending order of Rx power (e.g., reference signal received power (RSRP) (e.g., $1^{st}$ Tx beam, $2^{nd}$ Tx beam, . . . , $N^{th}$ Tx beam).

When the UE receives the DCI from the BS, the UE may transmit the following uplink control channel and/or uplink data channel using the UL Tx beams indicated by the DCI. The BS may receive uplink channels using UL Rx beams determined in consideration of updated UL Tx beams of the UE after transmission of the DCI to the UE.

In contrast, when the UE does not receive indication for the UL Tx beams from the BS, the UE may be configured to implicitly use existing UL Tx beams. For example, when indication for UL Tx beams is not delivered from the BS, the UE may be configured to transmit uplink channels (and/or signals) using UL Tx beams determined in an initial access procedure. Alternatively, when indication for UL Tx beams is not delivered from the BS, the UE may be configured to transmit uplink channels using UL Tx beams recently indicated (i.e., indicated immediately before the current transmission) by the BS.

Meanwhile, a case in which a UL beam management procedure has been performed but UL Tx beam received power is lower than receive power of previous (i.e., previously indicated) UL Tx beams may be generated. In this case, the BS may additionally deliver indication information (i.e., DCI indication information) about beam update to the UE. That is, a field indicating whether UL Tx beams of the UE have been updated may be newly added to the aforementioned DCI. For example, the field may be composed of 1 bit (e.g., 1 bit indicating ON/OFF). When the field of the DCI received by the UE indicates OFF, the UE does not change UL Tx beams to beams indicated by the BS (i.e., maintains previous UL Tx beams).

Furthermore, in the case of method 1, to use different Tx beams for an uplink control channel (e.g. PUCCH) and an uplink data channel (e.g., PUSCH), the BS may indicate different Tx beams used for the respective channel through DCI. For example, the BS may indicate N beams (i.e., Tx beam information) for the PUCCH in consideration of robustness and indicate J beams for the PUSCH. Here, J may be equal to or smaller than N. In this case, beam information (i.e., J beams) about the PUSCH may be set as a subset of beam information (i.e., N beams) about the PUCCH.

As described above, when the BS transmit information about UL Tx beams to the UE using the DCI, indication for UL beams (i.e., UL Tx beams of the UE) and beam change (or update) may be immediately performed.

(Method 2: Method of Indicating Information about UL Tx Beams Through Higher Layer Signaling)

Distinguished from method 1, with respect to Tx beam indication for transmission of an uplink control channel (e.g., PUCCH) and an uplink data channel (e.g., PUSCH), a BS may equally or differently indicate beams for the two channels through higher layer signaling. Here, higher layer signaling may include RRC signaling, signaling using a MAC-CE (MAC control element). Here, indicating equally may refer to delivery of one beam indication (i.e. same beam indication) for the uplink channels and indicating differently may refer to delivery of different beam indications for the uplink channels.

Here, information delivered through higher layer signaling (e.g., MAC-CE for UL Tx beam information) may be delivered in the form of a port (i.e., antenna port) and/or a resource index selected according to an allocated (or set) UL RS. For example, when an SRS resource is allocated, the information delivered through higher layer signaling may be configured in the form of an SRS port index and/or an SRS resource index. That is, the BS may transmit the port and/or resource index to the UE to indicate UL Tx beams set for the port and/or resource index to the UE. Alternatively, the information delivered through higher layer signaling may be delivered in the form of a beam ID mapped to a port and/or an index. When the BS indicates information about N beams, the BS may indicate the beams in the ascending order of Rx power and/or Rx quality (e.g., reference signal received power (RSRP), reference signal received quality (RSRQ)) (i.e., $1^{st}$ Tx beam, $2^{nd}$ Tx beam, . . . , $N^{th}$ Tx beam).

Upon reception of the beam indication information from the BS through higher layer signaling as described above, the UE may transmit ACK/NACK information using the indicated (i.e., indicated through higher layer signaling) UL Tx beams when the reception has been successfully performed. That is, the UE may transmit ACK/NACK for the beam indication information received from the BS to the BS through the indicated UL Tx beams. When the UE transmits ACK, the UE may transmit the following uplink control channel and/or uplink data channel using the indicated UL Tx beams.

The BS may transmit beam indication information (e.g., MAC-CE for UL Tx beam information) through higher layer signaling and then receive ACK/NACK using UL Rx beams determined in consideration of updated UL Tx beams of the UE. Here, when the BS does not receive ACK or NACK in a predetermined period (i.e., predetermined time duration) or receives NACK, the BS may be configured to retransmit the beam indication information through higher layer signaling.

Alternatively, a method of performing the procedure in which the UE transmits ACK/NACK information to the BS and the procedure in which the BS receives the ACK/NACK information from the UE through conventional serving beams and indicating change of UL Tx beams by the BS which has received ACK through DCI may be considered in the aforementioned UE and BS operations. In this case, when indication for the change is delivered to the UE, the UE may update UL Tx beams on the basis of the UL beam information indicated by the BS and the BS may update UL Rx beams. In other words, a method of performing procedures related to ACK/NACK using conventional beams (i.e., conventional serving beams) and then updating uplink beams (i.e., UL Tx beams and/or UL Rx beams) according to indication of the BS may be considered.

As described above in method 1, when the UE does not receive indication for UL Tx beams (i.e., beam information related to uplink transmission) from the BS, the UE may be configured to (implicitly) use previous UL Tx beams. For example, when indication for UL Tx beams is not transmitted from the BS, the UE may be configured to transmit uplink channels using UL Tx beams determined in the initial access procedure or UL Tx beams recently indicated (i.e., immediately before the current transmission).

In the case of method 2, to use different Tx beams for an uplink control channel (e.g., PUCCH) and an uplink data channel (e.g., PUSCH), the BS may separately indicate Tx beams used for each channels through higher layer signaling (e.g., MAC-CE, RRC signaling or the like). For example, the BS may indicate N beams (i.e., Tx beam information) for the PUCCH in consideration of robustness and indicate J beams for the PUSCH. Here, J may be equal to or smaller than N. In this case, beam information (i.e., J beams) about the PUSCH may be set as a subset of beam information (i.e., N beams) about the PUCCH.

When a plurality of UEs performs uplink transmission, the BS may deliver beam indication information indicating UL Tx beams or a UL Tx beam group to specific UEs. Specifically, the BS may set the same UL Tx beams or UL Tx beam group for UEs that indicate ACK/NACK at the same timing in consideration of asymmetric ACK/NACK timing for UEs. In other words, the BS may set UL beams or a UL Tx beam group for each ACK/NACK timing (i.e., UEs which transmit ACK/NACK information at the same timing).

Alternatively, the BS may set (the same) UL Tx beams or UL Tx beam group for UEs using (or having) the same previous serving UL Tx beams in consideration of asymmetric ACK/NACK transmission timing for UEs. That is, the BS may group UEs using the same UL Tx beams previously and indicate UL Tx beams to each group.

As described above, when the BS transmits information about UL Tx beams to the UE through higher layer signaling, control channel overhead is reduced compared to a case in which indication of UL beams (i.e., UL Tx beams of a UE) and beam change (or update) are performed through DCI.

(Method 3: Method of Indicating Information about UL Tx Beams Through DCI and Higher Layer Signaling)

The BS may transmit information about UL Tx beams to the UE through a combination of the above-described method 1 and method 2. For example, the BS may transmit N pieces of UL Tx beam information with respect to uplink channels (e.g., PUCCH and/or PUSCH) to the UE through higher layer signaling and indicate specific or some UL Tx beam information among the N pieces of information through scheduling (i.e., DCI).

In other words, the UE may transmit information about one or more maydidate UL Tx beams to the UE through higher layer signaling (first step) and deliver information indicating specific or some maydidate UL Tx beams among the one or more maydidate UL Tx beams to the UE through DCI (second step). That is, the BS may hierarchically indicate information about UL Tx beams to the UE through a two-step procedure. This method may be more efficient than the above-described method 1 and method 2 in consideration of control channel overhead and a time required for uplink beam indication/change (or update).

In this method, the BS may deliver information about a combination (or group) of UL Tx beams as well as the N pieces of UL Tx beam information with respect to uplink channels (e.g., PUCCH and/or PUSCH) through higher layer signaling. Here, a UL Tx beam combination may refer to a beam combination (or group) configure to use specific multiple beams from among N UL Tx beam maydidate groups at the same time instance when the N UL Tx beam maydidate group is assumed. Subsequently, the BS may indicate UL Tx beams of the UE by transmitting information indicating a specific combination through DCI. Accordingly, control overhead (i.e., DCI control overhead) related to a downlink control channel may be reduced.

For example, the BS may deliver information about N UL Tx beams transmitted through higher layer signaling and configuration information about UL Tx beam combination 1 (i.e., first beam combination) and UL Tx beam combination 2 (e.g., second beam combination) to the UE. Here, UL Tx beam combination 1 may be configured to indicate transmission of uplink channels simultaneously using N UL Tx beams and UL Tx beam combination 2 may be configured to indicate transmission of uplink channels using the best UL Tx beam among the N UL Tx beams. Here, the best UL Tx beam may refer to a UL Tx beam having highest receive power (e.g., RSRP, RSRQ, etc.).

When two UL beam combinations are present, the BS may immediately indicate UL Tx beam combination 1 and UL Tx beam combination 2 using 1-bit information. Here, the 1-bit information may be transmitted through DCI. The number of UL Tx beams may be extended to 2 or more. For example, when 4 UL Tx beam combinations are configured, the 1-bit information may be replaced by 2-bit information.

Then, the UE receives UL Tx beam information through higher layer signaling and transmit an uplink channel (e.g., PUCCH or PUSCH) through the combination indicated through the DCI and indicated UL Tx beams. Specifically, when the UE receives information indicating UL Tx beam combination 1 (e.g., "0" of the 1-bit information) from the BS through the DCI, the UE may transmit an uplink channel using N UL Tx beams indicated through higher layer signaling.

On the contrary, when the UE receives information indicating UL Tx beam combination 2 (e.g., "1" of the 1-bit information), the UE may transmit the uplink channel using the best UL Tx beam among the N UL Tx beams indicated through higher layer signaling. Here, the best UL Tx beam may be determined by the UE according to measurement results or determined by the BS on the basis of measurement results reported by the UE to the BS and indicated to the UE.

Second Embodiment—Method of Indicating Tx Beam of UE According to UL RS Configuration The BS may configure a UL RS in consideration of UE capability (e.g., the number of UL Tx beams of a UE, the number of transmission and reception units (TXRU) of the UE, etc.) for UL beam management. Here, the BS may perform a UL Tx beam indication procedure according to UL RS configuration. In other words, the BS may indicate UL Tx beams for a UE on the basis of UL RS configuration (or for each UL RS configuration).

When the number (e.g., M) of UL Rx beams of the UE is equal to or greater than a predetermined number, the BS may configure (or allocate) a UL RS over a plurality of slots instead of one slot (or subframe). Here, the BS may be configured to perform Tx beam indication (i.e., UL Tx beam indication of the UE) for each UL RS transmission. In this case, ambiguousness with respect to whether the UE needs to transmit an uplink channel using previous UL Tx beams or newly indicated UL Tx beams for each Tx beam indication may be generated.

To prevent this ambiguousness, the BS may be configured to sweep a total number of UL Tx beams corresponding to UL RSs or a total number of (e.g., M) UL Tx beams of the UE and then deliver information about Tx beam indication. Here, the total number of UL Tx beams corresponding to UL RSs may refer to a total number of UL Tx beams corresponding to UL RSs allocated (or configured) over a plurality of slots.

Further, the BS may be configured to deliver information about indication and/or Tx beam indication for preventing the UE from changing previous UL Tx beams (e.g., beams carrying a PUCCH and/or a PUSCH) until the configured UL beam procedure is ended. That is, the BS may additionally transmit information indicating that the UE maynot change UL Tx beams until the UL beam procedure (i.e., beam sweeping) for pre-configured UL RSs is ended.

Subsequently, when the UE receives indication for UL Tx beam change, the UE may be configured to use UL Tx beams corresponding to the received Tx beam indication. That is, the UE may change previous UL Tx beams to UL Tx beams newly indicated by the BS only when the UE receives the indication for UL Tx beam change.

Indication for UL Tx beam change of the UE is clearly delivered through the above-described method, and thus the aforementioned ambiguousness related to configuration of UL Tx beams may be solved.

In the above-described embodiments of the present invention, the method of explicitly indicating and/or configuring UL Tx beams by the BS in a semi-static scheme and/or a dynamic scheme with respect to UL Tx beams for transmission of uplink channels (i.e., PUCCH and/or PUSCH) have been considered. For example, the semi-static scheme may refer to a scheme using RRC signaling and the dynamic scheme may refer to a scheme using MAC-CE or DCI. Specifically, the UE receives information about one or more beams (e.g. one or more beams configured for PUCCH transmission) through a first signaling (e.g. RRC signaling) from the BS and receives information indicating a specific beam among the one or more beams through a second signaling (e.g. MAC-CE, DCI) from the BS. Accordingly, the US may transmit an uplink channel (e.g. PUCCH) via the indicated specific beam.

Here, the aforementioned method may be applied to transmission of SRS resources as a method of indicating and/or configuring UL Tx beams for uplink transmission. The SRS resources may include SRS resources for beam management and/or SRS resources for channel acquisition (or channel estimation).

In the NR system, a method of using multiple serving beams, a beam pair link (BPL) and/or Tx-Rx beam association may be considered for robustness of DL control channels and/or DL data channels. When beam correspondence (or channel reciprocity) is not established, the BS may perform beam management using a UL RS and/or a UL signal. Then, the BS may indicate (and/or configure) UL Tx beams and/or UL Rx beams (of the UE) through indication for a SRI (SRS Resource Index), a port index, a RACH ID and/or a SR (Scheduling Request) ID.

On the contrary, when beam correspondence (or channel reciprocity) is established, the BS may indicate (or configure) reciprocal UL Tx beams and/or UL Rx beams through indication of DL Tx beams and/or DL Rx beams. Here, the BS may use a DL RS resource ID, a port index, a BPL and/or a serving beam index corresponding to DL Tx beams and/or DL Rx beams instead of indication of DL Tx beams and/or DL Rx beams.

In addition, when beam correspondence (or channel reciprocity) is established, the BS may indicate (or configure) reciprocal UL Tx beams and/or UL Rx beams through indication of UL Tx beams and/or UL Rx beams. In this case, the BS may indicate (or configure) UL Tx beams and/or UL Rx beams through indication for a SRI, a port index, a RACH ID and/or an SR ID, as described above.

Furthermore, in various embodiments of the present invention, in addition to direct (i.e., explicit) UL Tx beam indication for transmission of UL channels and/or signals (e.g., PUCCH, PUSCH and SRS), indirect (i.e., implicit) UL Tx beam indication may be performed. In this case, a UE may determine UL Tx beams according to DL reception quality or previously indicated (or configured) DL beam information even when the UE does not receive direct UL beam indication information.

For example, when the UE does not receive direct UL Tx beam indication (or configuration) from the BS, the UE may transmit an uplink channel and/or signal using a reciprocal UL Tx beam of a DL Rx beam having the highest DL Rx signal. Here, the DL Rx beam having the highest DL Rx signal may refer to a DL Rx beam corresponding to a DL Tx beam (or DL RS) having the highest Rx signal. In this case, the UE may determine a Rx beam (i.e., DL Rx beam) having the highest Rx quality (i.e., highest Rx quality value) from among beams through which DL channels and/or signals are received, select a UL Tx beam related to (or having a reciprocal relationship with) the determined Rx beam and transmit an uplink channel and/or signal through the selected UL Tx beam.

As another example, when the UE does not receive (separate) direct UL Tx beam indication (or configuration) from the BS, the UE may transmit an uplink channel and/or signal using a most recently indicated (or transmitted) DL control channel and/or a reciprocal UL Tx beam of a Rx beam (i.e., DL Rx beam) (corresponding to a Tx beam) of a DL data channel. In other words, the UE may select a UL Tx beam related to (or having a reciprocal relationship with) a DL Rx beam most recently used to receive a DL channel and/or signal and transmit a UL channel and/or signal through the selected UL Tx beam.

In the case of a system supporting multiple cells (or TRPs), configuration information related to the aforementioned indirect UL Tx beam indication may be (additionally) set through higher layer signaling in advance. This is for the purpose of considering downlink and/or uplink asymmetric interference and/or load balancing. For example, the BS may previously indicate (or configure) that a reciprocal UL Tx beam of a DL Rx beam corresponding to the second or third best serving Tx beam (or BPL or DL RS) is used for a DL Rx beam corresponding to the best serving Tx beam (or BPL or DL RS). Alternatively, the BS may previously indicate (or configure) a reciprocal UL Tx beam for each serving Tx beam (or BPL or DL RS).

In addition, in various embodiments of the present invention, a method of indicating (or configuring) UL Tx beams of a UE according to the usage and/or type of an uplink control channel (e.g., PUCCH) may also be considered. For example, the PUCCH may be divided into a short PUCCH and a long PUCCH according to the usage or type thereof in the NR system. Here, the short PUCCH may refer to a PUCCH composed of a short region (e.g., one or two OFDM symbols) in consideration of transmission of ACK/NACK information.

In contrast, the long PUCCH may refer to a PUCCH compose of a long region (e.g., 4 to 14 OFDM symbols) for supporting a large payload in consideration of transmission of channel state information (CSI). Here, the CSI may include periodic CSI, semi-persistent CSI and/or aperiodic CSI.

In this case, similarly to the above description, the BS may indicate (or configure) UL Tx beams of a UE directly or indirectly according to the usage and/or type of an uplink control channel (e.g. PUCCH).

Figure 8:
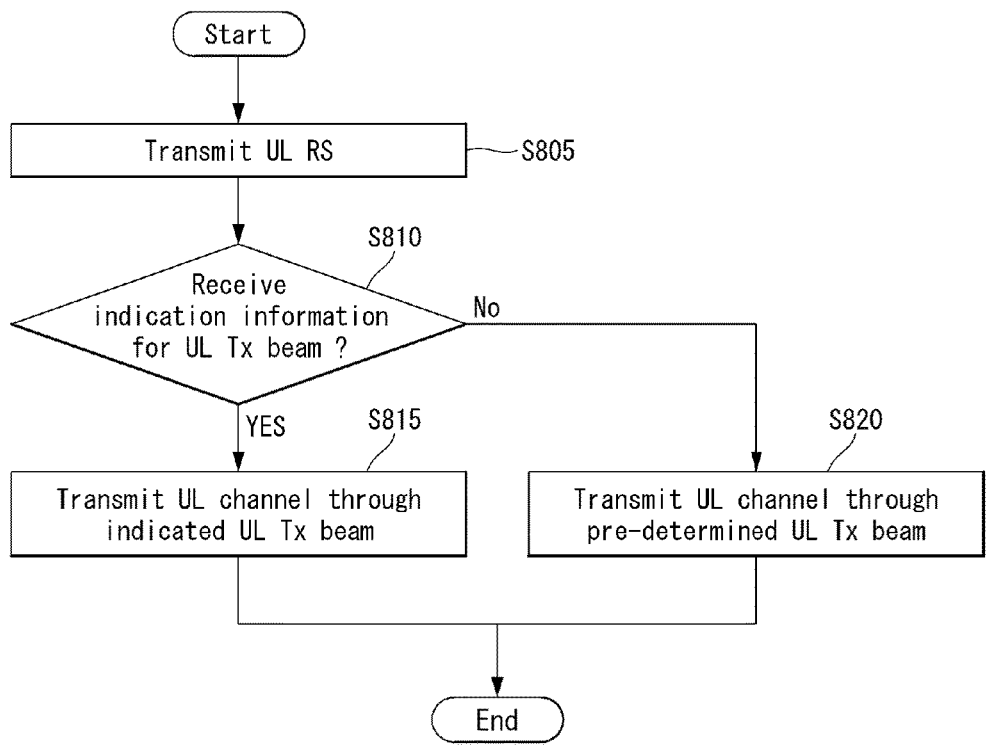
FIG. 8 illustrates an operation flowchart of a terminal which performs uplink transmission to which the methods proposed in the present description are applicable.

FIG. 8 is a flowchart of operation of a UE which performs uplink transmission to which the methods proposed in the present description are applicable. FIG. 8 is for convenience of description and does not limit the scope of the present invention.

Referring to FIG. 8, it is assumed that a UE without beam correspondence (i.e., beam reciprocity or channel reciprocity) transmits an uplink channel and/or signal according to UL Tx beam indication from a BS. Here, the UE without beam correspondence may refer to a UE which may not use a beam used to receive a downlink channel and/or signal as a beam for transmitting an uplink channel and/or signal without separate indication.

In step S805, the UE transmits at least one UL RS to the BS. Here, the at least one UL RS may be configured to correspond to one or more UL Tx beams supported by the UE. The BS may perform beam management procedure (i.e., beam sweeping) for determining a UL Tx beam of the UE using the at least one UL RS transmitted thereto.

In step S810, the UE receives indication information about the UL Tx beam of the UE from the BS. The UL Tx beam is determined from among the one or more UL Tx beams of the UE using the at least one UL RS. Here, one or more UL Tx beams may be indicated by the indication information. As described above, the indication information may be composed of a resource (e.g., SRS resource) index, a port index and/or a beam index indicating the UL Tx beam.

Upon reception of the indication information from the BS, the UE transmits a specific uplink channel through the UL Tx beam (indicated by the received indication information) on the basis of the received indication information in step S815. In this case, the specific uplink channel may be an uplink control channel (e.g., PUCCH) and/or an uplink data channel (e.g., PUSCH), and the same UL Tx beam or different UL Tx beams may be used for the channels as described above.

In contrast, when the UE does not receive the indication information from the BS, the UE transmits the specific uplink channel through a pre-determined UL Tx beam of the UE in step S820. As described in the above embodiments, the pre-determined UL Tx beam may be set on the basis of a specific DL Rx beam among one or more DL Rx beams of the UE or may refer to an UL Tx beam indicated by the BS in an initial access procedure between the UE and the BS.

Particularly, when the pre-determined UL Rx beam is set on the basis of the specific DL Rx beam, the specific DL Rx beam may be a DL Rx beam supporting the best Rx quality (e.g., RSRP, RSRQ, etc.) for at least one of downlink channels and/or downlink reference signals received from the BS. That is, the UE may use a reciprocal UL Tx beam of the DL Rx beam corresponding to the DL Tx beam (or DL RS) having the best Rx quality for downlink channels and/or signals. Alternatively, the specific DL Rx beam may be a DL Rx beam corresponding to a DL Tx beam (most recently) indicated by the BS.

In addition, the UE may receive the indication information through at least one of DCI and higher layer signaling in step S810. That is, the UE may receive the indication information from the BS through DCI, higher layer signaling or a hierarchical method of using both the DCI and higher layer signaling.

Here, when the indication information is received through downlink control information, the indication information may include an indicator indicating whether the UL Tx beam of the UE is updated. When the indication information is received through higher layer signaling (e.g., MAC-CE or RRC signaling), the UE may transmit ACK/NACK information for the indication information to the BS. Here, when the UE transmits ACK information, the specific uplink channel may be transmitted after transmission of the ACK information. As described above, the indication information may be configured per ACK/NACK information transmission timing.

Apparatuses to which the Present Invention is Applicable

Figure 9:
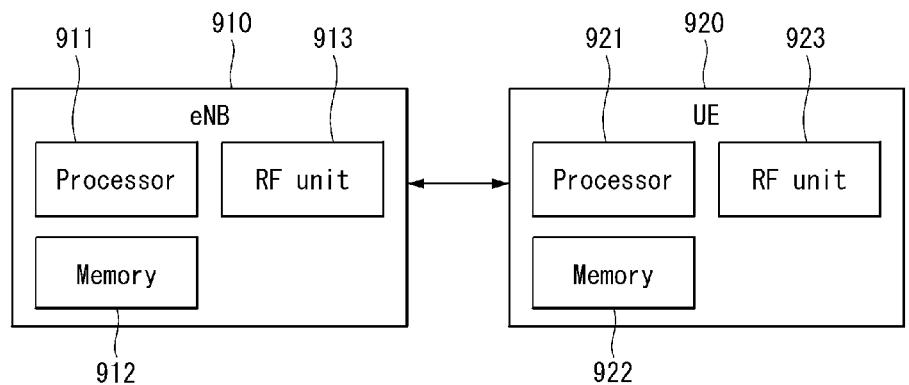
FIG. 9 is an exemplary block diagram of a wireless communication apparatus to which the methods proposed in the present description are applicable.

FIG. 9 is a block diagram of wireless communication apparatuses to which the methods proposed in the present description are applicable.

Referring to FIG. 9, a wireless communication system includes an eNB 910 and a plurality of UEs 920 located in the coverage of the eNB 910.

The eNB includes a processor 911, a memory 912 and a radio frequency (RF) unit 913. The processor 911 implements the functions, procedures and/or methods proposed in FIGS. 1 to 8. Radio interface protocol layers may be implemented by the processor 911. The memory 912 is connected to the processor 911 and stores various types of information for driving the processor 911. The RF unit 913 is connected to the processor 911 and transmit/receives radio signals.

The UE 920 includes a processor 921, a memory 922 and an RF unit 923.

The processor 921 implements the functions, procedures and/or methods proposed in FIGS. 1 to 8. Radio interface protocol layers may be implemented by the processor 921. The memory 922 is connected to the processor 921 and stores various types of information for driving the processor 921. The RF unit 923 is connected to the processor 921 and transmit/receives radio signals.

The memories 912 and 922 may be provided inside or outside of the processors 911 and 921 and connected to the processors 911 and 921 through various known means. In addition, the eNB 910 and/or the UE 920 may include a single antenna or multiple antennas.

Figure 10:
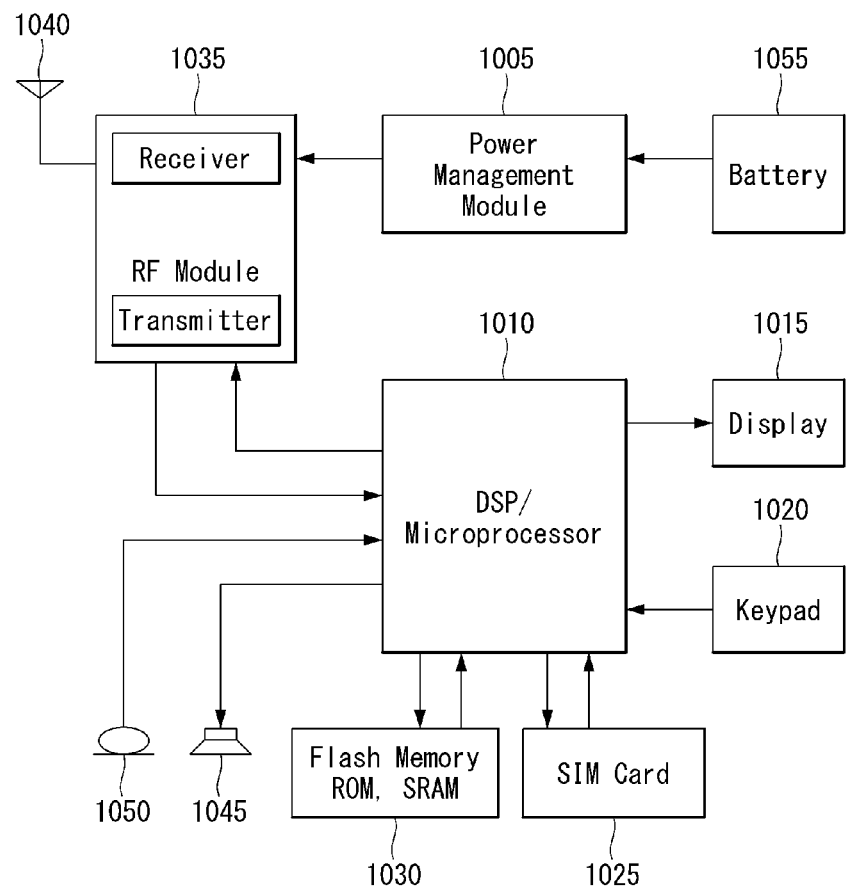
FIG. 10 is a block diagram of a communication apparatus according to an embodiment of the present invention.

FIG. 10 is a block diagram of a communication apparatus according to an embodiment of the present invention.

Particularly, FIG. 10 illustrates the UE of FIG. 9 in more detail.

Referring to FIG. 10, the UE may include a processor (or a digital signal processor (DSP)) 1010, an RF module (or an RF unit) 1035, a power management module 1005, an antenna 1040, a battery 1055, a display 1015, a keypad 1020, a memory 1030, a SIM (Subscriber Identification Module) card 1025 (which is optional), a speaker 1045 and a microphone 1050. The UE may include a single antenna or multiple antennas.

The processor 1010 implements the functions, procedures and/or methods proposed in FIGS. 1 to 8. Radio interface protocol layers may be implemented by the processor 1010.

The memory 1030 is connected to the processor 1010 and stores information related to operation of the processor 1010. The memory 1030 may be provided inside or outside of the processor 1010 and connected to the processor 1010 through various known means.

A user inputs command information such as a telephone number, for example, pressing (or touching) buttons of the keypad 1020 or according to voice activation using the microphone 1050. The processor 1010 receives this command information and executes an appropriate function such as calling using the telephone number. Operational data may be extracted from the SIM card 1025 or the memory 1030. In addition, the processor 1010 may display the command information or driving information on the display 1015 such that the user recognizes the information or for convenience.

The RF module 1035 is connected to the processor 1010 and transmits/receives RF signals. The processor 1010 delivers command information to the RF module 1035 to transmit an RF signal constituting voice communication data, for example. The RF module 1035 includes a receiver and a transmitter for receiving and transmitting RF signals. The antenna 1040 serves to transmit and receive RF signals. When an RF signal is received, the RF module 1035 may transmit the signal for processing by the processor 1010 and convert the signal into a baseband signal. The processed signal may be converted into audible or readable information output through the speaker 1045.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although the methods of performing uplink transmission in a wireless communication system of the present invention have been described on the basis of examples applied to 3GPP LTE/LTE-A and 5G (New RAT system), the present invention may be applied to various other wireless communication systems.

What is claimed is:

1. A method for performing an uplink transmission in a wireless communication system by a terminal without beam correspondence, the method comprising, transmitting, to a base station (BS), at least one Uplink Reference Signal (UL RS);

receiving, from the BS, information related to an Uplink Transmission beam (UL Tx beam) of the terminal; and transmitting, to the BS, a specific uplink channel through the UL Tx beam, based on the information, wherein the UL Tx beam is determined among one or more UL Tx beams of the terminal by using the at least one UL RS, wherein, when the terminal does not receive the information from the BS, the specific uplink channel is transmitted through a pre-determined UL Tx beam of the terminal, and wherein, when the at least one UL RS is transmitted over a plurality of slots, the terminal is configured to receive, from the BS, information for prohibiting the transmission through the UL Tx beam before a beam procedure related to the at least one UL RS is terminated.

2. The method of claim 1, wherein the at least one UL RS is configured to correspond to the one or more uplink transmission beams.

3. The method of claim 2, wherein the pre-determined UL Tx beam is configured based on a specific downlink reception beam (DL Rx beam) among one or more DL Rx beams of the terminal, and wherein the specific DL Rx beam supports the best reception quality for at least one of downlink channel or downlink reference signal received from the BS.

4. The method of claim 2, wherein the pre-determined UL Tx beam is configured based on a specific downlink reception beam (DL Rx beam) among one or more DL Rx beams of the terminal, and wherein the specific DL Rx beam is a downlink transmission beam (DL Tx beam) configured by the BS.

5. The method of claim 4, wherein the DL Tx beam is a DL Tx beam of the BS most recently configured by the BS.

6. The method of claim 2, wherein the pre-determined UL Tx beam is a UL Tx beam configured by the BS in an initial access procedure between the terminal and the BS.

7. The method of claim 2, wherein the information related to the UL Tx beam of the terminal is received through at least one of downlink control information or higher layer signaling.

8. The method of claim 7, wherein when the information related to the UL Tx beam of the terminal is received through the downlink control information, the information related to the UL Tx beam of the terminal comprises parameter for whether to update the UL Tx beam of the terminal or not.

9. The method of claim 7, further comprising:

when the information related to the UL Tx beam of the terminal is received through the higher layer signaling, transmitting, to the BS, ACK/NACK information for the information related to the UL Tx beam of the terminal.

10. A terminal for performing an uplink transmission in a wireless communication system, without beam correspondence, the terminal comprising, a transceiver, and a processor, operatively coupled to transceiver, wherein the processor is configured to:

transmit, to a base station (BS), at least one Uplink Reference Signal (UL RS);

receive, from the BS, information related to an Uplink Transmission beam (UL Tx beam) of the terminal; and transmit, to the BS, a specific uplink channel through the UL Tx beam, based on the information, wherein the UL Tx beam is determined among one or more UL Tx beams of the terminal, by using the at least one UL RS, wherein, when the terminal does not receive the information from the BS, the specific uplink channel is transmitted through a pre-determined UL Tx beam of the terminal, and wherein, when the at least one UL RS is transmitted over a plurality of slots, the terminal is configured to receive, from the BS, information for prohibiting the transmission through the UL Tx beam before a beam procedure related to the at least one UL RS is terminated.

* * * * *